UNITED STATES PATENT OFFICE.

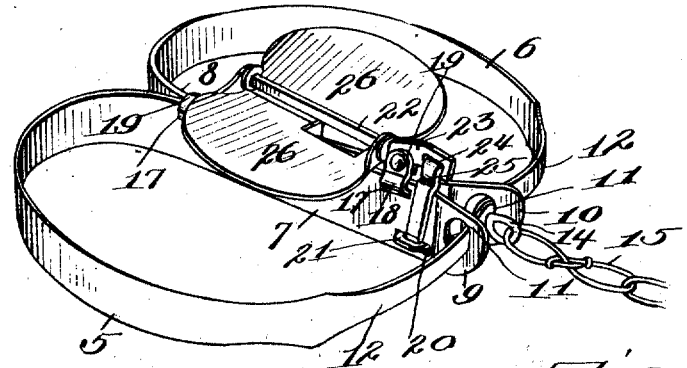

JACOB JACKSON, OF GREEN BAY, WISCONSIN.

ANIMAL-TRAP.

1,000,007.     Specification of Letters Patent.     Patented Aug. 8, 1911.

Application filed March 15, 1910. Serial No. 549,448.

*To all whom it may concern:*

Be it known that I, JACOB JACKSON, a citizen of the United States, residing at Green Bay, in the county of Brown and State of Wisconsin, have invented new and useful Improvements in Animal-Traps, of which the following is a specification.

This invention relates to animal traps, and the objects of the same are to provide a trap of light, strong and durable construction of about one-half the dimensions of the usual traps; to provide a trap that will, when closing, catch the animal high on the leg, thus preventing it from twisting off its leg; to provide a trap that can be readily jerked about and not apt to twist off the leg of the trapped animal nor liable to become tangled in weeds or brush; and to provide a trap of such reduced dimensions that it can be readily concealed in small holes and narrow runways and more easily packed and transported.

The trap proper consists of two resilient parts, each of which has one end apertured to loosely receive the other end, the ends of the parts passing through the apertures being slightly reduced. In each part the tension is such that the slightly reduced end or extremity tends to pass as far as possible through the aperture. When, therefore, the parts are pivoted, the trap being in set position, the tension acts to separate one edge of the broad ends and in consequence raises the jaws. This brings the parts to such a position that the continued tension of the parts, together with the restricted relative position of the apertures and the pivoted relation of the tapered ends, brings the jaws forcibly together and holds them there.

The trap further consists of a pan which is made in two parts automatically opened and closed with the opening and closing of the jaws, the sections of the pan projecting upwardly on opposite sides of the leg of the trapped animal when the jaws are closed so as to prevent the animal from chewing off its leg under the jaws by covering enough of the leg to prevent the animal from reaching the same.

The invention still further consists in the details of construction and arrangement of the several parts which will be more fully hereinafter specified.

In the drawing: Figure 1 is a perspective view of a trap shown set and embodying the features of the invention. Fig. 2 is a longitudinal section through the center of the trap as shown by Fig. 1. Fig. 3 is an edge elevation of the trap shown open. Fig. 4 is a transverse vertical section through the open trap. Fig. 5 is a transverse vertical section through the trap in closed condition. Fig. 6 is a perspective view of the trap shown closed and illustrating the operation of the trap in its upward movement when released. Figs. 7 and 8 are respectively detail sectional perspective and cross-sectional views illustrating a slight modification of the trigger mechanism.

The numerals 5 and 6 designate the jaws which are bowed and continuous with base members 7 and 8 respectively, the base members terminating in upturned or deflected ends 9 and 10 each having a slot 11 formed therein. The jaws 5 and 6 are reduced as at 12 and individually passed through and freely movable in the slots 11, the ends of the jaws being overlapped as at 13 and pivotally connected by the shank of an eye 14. The jaws 5 and 6 and the base members 7 and 8 which are continuous or integrally formed therewith, are constructed of suitable spring metal, preferably thin steel, and the reduced extremities 12 of the jaws have a considerable projection through and beyond the deflected ends 9 and 10 of the base member, and when the jaws are opened they are gradually drawn through the deflected ends 9 and 10 of the base members and at the same time the latter are overturned with the jaws until they assume the position particularly shown by Fig. 1 and at which time the jaws are fully open. To the eye 14 a securing chain or analogous device 15 is attached and may be of any suitable length, said chain, as will be readily understood, being fixed to some stationary object when the trap is in use to prevent a trapped animal from dragging the trap away from the location where it has been set in operative position. To insure a regular movement of the reduced extremities 12 of the jaws 5 and 6 through the openings 1 each opening has an outer depending ard 16 which prevents lateral movement f the said extremities, and the two guards also serve as guides for the extremities. The upwardly directed ends 9 and 10 of the base members 7 and 8 are disposed in a flaring position relatively to each other when the jaws 5 and 6 are opened or set to avoid obstruction by the eye 14 when the said ends are moving outwardly through the openings 11 in setting the trap, as illustrated by Fig. 1. The base members 7 and 8 have continuous edges formed with slots 17 engaged by tubular connecting members 18 to form loose hinges which freely compensate for the opening and closing movements of the jaws 5 and 6 and the corresponding movements of the base members 7 and 8. The forward tubular connecting member 18 has ears 19 forming a part thereof or projecting therefrom for a purpose which will be presently explained. The base member 7 in the edge portion thereof opposite that having the slots 17 therein and near the front of the trap has a slot 20 cut therethrough to receive an apertured locking tongue 21 carried by the base member 8 when both of the base members 7 and 8 are turned to set the jaws in open position, as shown particularly by Figs. 1 and 2.

The pan or releasing means of this improved trap differs essentially from pans as ordinarily constructed, and comprises a supporting pintle or stem 22 having its forward extremity flattened as at 23 and pivotally disposed and held between the ears 19 of the forward tubular connecting member 18, the said flattened portion of the stem being continued from the ears 19 and formed with a slot 24 in which is loosely hung a latch or trigger 25, the free end of the latter being reduced to engage the apertured tongue 21. On the pintle or stem 22 pan sections 26 are movably mounted, each pan section having a stop flange 27 projecting from its inner portion, the flanges 27 being bent at approximately right angles to the pan sections 26 and adapted to bear against the outer sides of the base members 7 and 8 when the jaws are open to prevent depression of the pan sections beyond a predetermined point and thereby hold said sections in operative position. The said flanges 27 also bear against the inner or uppermost sides of the base members 7 and 8 when the trap has been sprung to hold the pan sections 26 disposed in upright position over a considerable portion of the leg and foot of the trapped animal, the pan sections serving the dual function of means for releasing the trap and as means for covering a portion of the leg of the trapped animal when the trap has been sprung and the jaws grip the leg of an animal, as clearly shown by Fig. 5. The pan sections 26 are imperforate and extend far enough upwardly over the leg of the trapped animal to obstruct the animal in gnawing off or releasing the leg by severing the same as is often the custom of a trapped animal.

Normally the jaws 5 and 6 and base members 7 and 8 occupy the position shown by Fig. 6 or are disposed edge to edge in close relation and the jaws extend in regular curved lines over the base members. In opening or setting the trap the jaws are spread apart by pressing downwardly on the upturned ends 9 and 10 of the base members, the pressure on the said ends being continued until both the jaws and base members stand edgewise with relation to the surface on which the trap is disposed. When the jaws have been fully opened the pan sections 26 gravitate and occupy the position shown by Figs. 1, 2, 3 and 4 and the perforate tongue 21 is projected through the slot 20. The jaws are then locked or set by slightly tilting the forward flattened extremity 23 of the pintle or stem 22 downwardly, thus raising the pan sections and lowering the trigger or catch 25 which engages or is caused to engage the perforation of the tongue 21. When the trap is thus set it may be covered by leaves, grass or other light substance, and may be disposed in a hole in the ground, a slight depression or in an animal runway. The animal in stepping upon the trap engages the pan sections, either one or both, and depresses the pintle or stem 22, thereby releasing the catch or trigger 25 and causing the jaws 5 and 6 to forcefully close over the leg. When the jaws are released they catch the animal high up on the leg owing to the assemblage of the extremities 12 with the ends 9 and 10 as hereinbefore explained and catch the leg of the animal at an elevated point or high up on the leg with material advantages in securing the trapped leg with such force as to resist working loose of the the jaws by the efforts of the animal to release himself. As hereinbefore noted, the pan sections 26 automatically close over the foot and a considerable portion of the trapped leg and prevent the animal from gnawing through or reaching the leg to sever the same.

It will be observed that the trap as a whole has a springing action and the jaws have a lateral or sidewise resilient action imparted thereto when the said jaws are released in view of the continuous formation of the jaws with the base members and the movable association of the jaws through the medium of the extremities 12 with the ends 9 and 10 of the base members.

In the construction of trap just explained there is a possibility of the pintle or stem 22 and member 18 turning to the left by the animal treading only on the left pan section 26, and as a consequence the trigger 25 would be pressed down more positively into engagement with the slotted tongue 21 and the trap would not be released or sprung. To obviate this possibility the construction shown by Figs. 7 and 8 has been devised. In this latter construction the connecting member 18 is provided with a forwardly projecting angular stop lug 28 and the forward end of the pintle or stem 22 formed with an angular terminal 29 having a depending shoulder 30. In this construction, the trigger 31 is movably connected to the base member 8 and angularly bent for movement through a slot 32 in the base member 7 and upwardly over the latter. The free end of the trigger in this instance is caused to engage the lower edge of the terminal 29 within the shoulder 30 and also the under edge of the lug 28, as clearly shown by Fig. 7, and if the left section 26 of the pan only receives the pressure of the animal's foot, the trigger will be uniformly pressed downwardly by the lug and terminal 29 in the direction of release and instantly become disengaged from the lug and terminal and the trap jaws will close against the leg of the animal.

It is proposed to tin or otherwise plate the parts of the trap to hide the odor of iron and defeat the scent of the animal. The parts of the trap will also be made heavy enough to adapt it for trapping various kinds of animals and it is proposed to vary the proportions and dimensions of the same as well as the minor details within the scope of the invention. The parts of the trap are very easily assembled and are so secured as to render the same strong and durable.

What is claimed is:

1. In a trap of the class specified, the combination of spring bases and jaws continuous with each other, the jaws and bases being hinged to each other, the spring tension of the jaws and bases moving the bases with the jaws in opening and closing operations, and means for holding the jaws set and for releasing the same.

2. A trap of the class described provided with a pair of spring bases and jaws, each base and its jaw being of continuous construction and independent of each other, means for loosely connecting the bases of the jaws and the terminals of the latter, and means for setting and releasing the jaws and the bases.

3. In a trap of the class specified, a pair of resilient jaws and base members continuous with each other and forming the spring means for the trap, portions of the base members being movably connected, the extremities of the jaws being connected together and freely movable through extremities of the base members, and means for setting and releasing the jaws and base members.

4. A device of the class specified having combined spring bases, jaws continuous with each other, and means for movably connecting the bases at intermediate points and the ends of the jaws, the trap having an upward movement imparted thereto when the jaws are released and perform a closing movement, and means for setting and releasing the jaws and bases.

5. A trap of the class specified having opening and closing jaws and bases constructed of spring material and constituting the spring means for the trap, the ends of the jaws being movably connected, the bases having a rising movement imparted thereto during the closing movement of the jaws.

6. A trap having opening and closing continuous bases and jaws movably connected to each other, the bases having hinge connections and provided with setting and releasing means, and automatically operating means opened and closed by the corresponding movements of the bases for partially covering the leg of a trapped animal.

7. A trap having opening and closing spring jaws and automatically operating opening and closing bases continuous therewith and serving as the prime operating means to close the jaws when the latter are released, the said bases being movably connected, means for setting and releasing the jaws and bases and automatically operating means closed by the corresponding movement of the jaws to partially cover the leg of an animal caught between said jaws.

8. A trap comprising two spring elements constituting jaws and base members continuous with each other and having one set of terminals connected and movable through the remaining set of terminals, the said spring elements having lateral opening and closing movements and exerting a tension on the jaws, and means for setting and releasing the said elements.

9. The combination of two spring elements having base members and bowed portions continuous therewith and constituting the jaws and movably extending through the terminals of the said base members, the jaws having lateral opening and closing movements, means for holding the jaws and base members set and for releasing the same, and means for loosely connecting and hinging the base members and jaws, the said spring elements having a tension exerted thereon which, owing to the relative arrangement of the parts, will have a tendency to move the spring bases and jaws and exert a tension on the latter.

In testimony whereof I have hereunto set my hand in presence of two subscribing witnesses.

JACOB JACKSON.

Witnesses:
C. W. LOMAS,
FERN E. BUTLER.